UNITED STATES PATENT OFFICE.

PAUL E. VACQUEREL, OF NEW YORK, N. Y.

IMPROVEMENT IN COMPOSITIONS TO BE APPLIED TO THE SURFACE OF PAPER FOR ARTIFICIAL FLOWERS.

Specification forming part of Letters Patent No. 149,963, dated April 21, 1874; application filed February 14, 1874.

*To all whom it may concern:*

Be it known that I, PAUL E. VACQUEREL, of the city, county, and State of New York, have invented a new and useful Improvement in Composition for Treating Vegetable Paper, of which the following is a specification:

My invention has for its object to improve the composition described in Letters Patent No. 36,704, bearing date October 21, 1862. The ingredients of said composition were kerosene (petroleum) and tar, and it was intended for application to what is known as vegetable paper, which is used to cover artificial flowers. My composition is less volatile, and renders the paper more durable, also more transparent and less liable to tarnish or become dull, and thus have prematurely the appearance of being old.

In preparing my improved composition, I take three and one-fifth pounds of colophony; one and two-thirds pound of gum dammar; four-fifths of a pound of gum camphor; one gallon of spirits of turpentine; one-eighth of a gallon of poppy-seed oil; two gallons of kerosene-oil; and one gallon of castor-oil. The function of the poppy-seed oil is mainly to render the castor-oil more fluid. These ingredients are warmed and stirred over a slow fire until thoroughly mixed, when they may be removed from the fire, and the composition is ready for use.

The composition may be applied with a sponge to the paper spread upon a table or other smooth surface, or in any other convenient manner. The paper, when thoroughly saturated, is hung up to dry for from ten to twenty hours.

Vegetable paper is used for covering artificial flowers put up in boxes, and when prepared with my improved composition is more transparent, retains its peculiar characteristics longer, and is less liable to acquire a yellow and old appearance than when prepared in the ordinary manner.

Having thus described my invention, I claim as new and desire to secure by Letters Patent—

The composition for protecting and preserving the vegetable paper applied to artificial flowers, consisting of colophony, gum dammar and camphor, spirits turpentine, poppy-seed oil, kerosene, and castor-oil.

PAUL E. VACQUEREL. [L. S.]

Witnesses:
CH. F. THIRION,
DAVID T. S. FULLER.